United States Patent [19]

Rosenquist et al.

[11] Patent Number: 4,636,559

[45] Date of Patent: Jan. 13, 1987

[54] BIS(CYCLIC CARBONATES), PRECURSORS THEREOF, AND POLYCARBONATE COMPOSITIONS CONTAINING THEM

[75] Inventors: Niles R. Rosenquist, Evansville, Ind.; Thomas L. Evans, Clifton Park, N.Y.

[73] Assignee: General Electric Company, Schenectady, N.Y.

[21] Appl. No.: 744,074

[22] Filed: Jun. 12, 1985

[51] Int. Cl.$^4$ ............................................. C08G 63/62
[52] U.S. Cl. .................................. 528/370; 528/196; 528/371
[58] Field of Search ................................. 528/370, 196

[56] References Cited

U.S. PATENT DOCUMENTS 4,440,937  4/1984  Krimm et al. .................... 528/370
4,579,896  4/1986  Rosenquist ....................... 524/108

Primary Examiner—Harold D. Anderson
Attorney, Agent, or Firm—William H. Pittman; James C. Davis, Jr.; James Magee, Jr.

[57] ABSTRACT

Novel bis(cyclic carbonates) are useful as cross-linking agents for polycarbonate compositions (including cyclic polycarbonate oligomers), and, in combination with flame retardant agents, as anti-drip agents for polycarbonate resins. This bis(cyclic carbonates) may be prepared by the reaction of phosgene with novel tetraphenols, which in turn may be prepared by the condensation of aliphatic dialdehydes with phenols.

21 Claims, 7 Drawing Figures

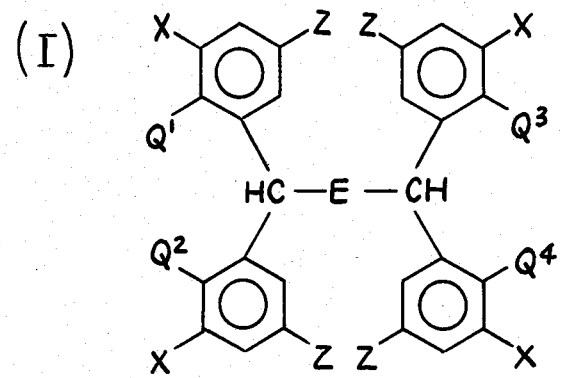
(I)
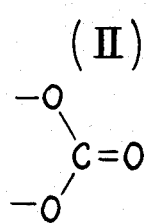
(II)
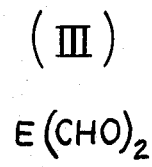
(III)
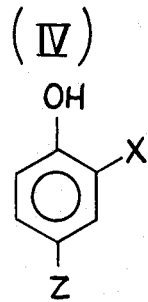
(IV)
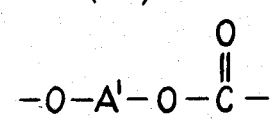
(V)
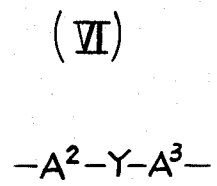
(VI)
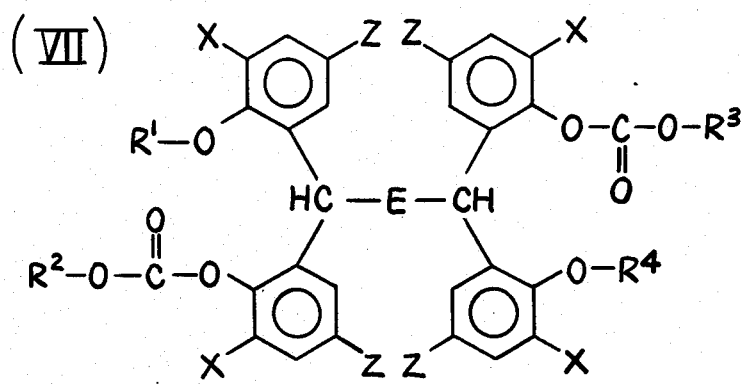
(VII)

BIS(CYCLIC CARBONATES), PRECURSORS THEREOF, AND POLYCARBONATE COMPOSITIONS CONTAINING THEM

This invention relates to new polycyclic compositions, methods for their preparation and uses thereof. In particular, it relates to bis(cyclic carbonates) and their phenolic precursors, and the use of said bis(cyclic carbonates) as crosslinking and anti-drip agents for polycarbonate resins.

Polycarbonates are well known polymers which have good property profiles, particularly with respect to impact resistance, electrical properties, optical clarity, dimensional rigidity and the like. These polymers are generally linear, but can be made with branched sites to enhance their properties in specific ways. Low levels of branching are generally incorporated into the resin by copolymerizing into the polymer backbone a polyfunctional reagent to yield a thermoplastic polycarbonate resin with enhanced rheological properties and melt strength which make it particularly suitable for such types of polymer processing procedures as the blow molding of large, hollow containers and the extrusion of complex profile forms. Special manufacturing runs must be set aside to prepare these branched polycarbonate resins.

Sufficiently higher levels of branching sites in the resin will cause resin chains actually to join to each other to form partially or fully crosslinked resin networks which will no longer be thermoplastic in nature and which are expected to exhibit enhancements over corresponding linear resins in physical properties and/or in their resistance to abusive conditions, such as exposure to organic solvents. A wide variety of means have been employed to produce crosslinking in polycarbonate resins. These generally involve the incorporation of a suitably reactive chemical group into the resin chain at its time of manufacture, as an additive to the resin after manufacture, or both. These reactive groups and the reactions they undergo are generally dissimilar from those characteristic of polycarbonate resins themselves and are therefore prone to have detrimental side effects on the physical and/or chemical properties of the polymer. The conventional test used to judge the success of these means for crosslinking is to observe the formation of gels due to the crosslinked material when a resin sample is mixed with a solvent, such as methylene chloride, in which normal linear polycarbonate resin is highly soluble.

It is well known in the art that polycarbonates may be rendered flame retardant by the use of conventional flame retarding additives. While these conventional flame retardant polycarbonates are quite useful in many areas, there are some applications wherein an even greater degree of flame retardancy is required. This is particularly the case when dealing with rather thin polycarbonate articles, e.g., less than about 125 mils thick. These thin polycarbonate articles are very prone to the dripping of flaming particles, thereby making it very difficult for them to meet certain flame retardant standards such as, for example, those of Underwriters Laboratories UL-94. This problem of dripping flaming particles, or drip, has been addressed by the use, in addition to the conventional flame retardant agents, of various types of drip retardants or drip inhibitors. However, many of these drip retardants are, to a certain degree, incompatible with polycarbonates and when used in quantities sufficient to render the polycarbonates drip retardant adversely affect their properties, such as optical clarity and surface appearance. There thus exists a need for drip retardants which are compatible with polycarbonates.

A principal object of the present invention, therefore, is to provide useful new compositions of matter, precursors therefor, and a method for their preparation.

A further object is to provide compositions which react with polycarbonates under suitable conditions to produce crosslinked resins.

A still further object is to provide compatible compositions which may be incorporated in polycarbonates, optionally in combination with flame retardant additives, to inhibit drip.

A still further object is to provide new polycarbonate compositions with advantageous properties.

Other objects will in part be obvious and will in part appear hereinafter.

In one of its aspects, the present invention includes additives for polycarbonate resins which have structures and reactivities very similar to those of the polycarbonate itself. Thus, they offer the dual advantages of allowing branch sites to be incorporated into polycarbonates during or subsequent to the manufacture thereof and of providing this branching or crosslinking by a method which produces residual structural groups in the final composition which are expected to be physically and chemically compatible with the resin.

The compositions contemplated as this aspect of the invention are polycyclic compounds having formula I in the drawings, wherein:

E is an alkylene radical containing from 2 to about 12 carbon atoms;

each of $Q^1$, $Q^2$, $Q^3$ and $Q^4$ is OH, or either or both of $Q^1$ and $Q^2$ together and $Q^3$ and $Q^4$ together form a carbonate group (i.e., a group of formula II);

each X is independently hydrogen or lower alkyl; and
each Z is independently lower alkyl.

As will be apparent from formula I and the foregoing description, the polycyclic compounds of this invention are bis(cyclic carbonates) and tetraphenols which may be considered their precursors. In formula I, the E value is an alkylene radical containing from 2 to about 12 carbon atoms. Included in the alkylene radicals are alkylidene radicals; i.e., divalent aliphatic hydrocarbon radicals in which both free valence bonds are attached to the same carbon atom. Illustrative E values are ethylene, propylene, trimethylene, butylene, isobutylene, 2,3-dimethylbutylene, hexylene, dodecylene, isopropylidene and 3,3-decylidene. Normal alkylene radicals having 2–6 carbon atoms are preferred.

The various Q values may be hydroxy groups or may be combined to form carbonate groups. Thus, the invention includes tetraphenols in which $Q^1$, $Q^2$, $Q^3$ and $Q^4$ are each hydroxy. It also includes bis(cyclic carbonates) in which $Q^1$ and $Q^2$ together and $Q^3$ and $Q^4$ together, from carbonate groups. Also contemplated are mono(cyclic carbonates) in which either of the $Q^1$–$Q^2$ and $Q^3$–$Q^4$ combinations, but not both, form a carbonate group. While such mono(cyclic carbonates) are not a preferred part of the invention, they may be encountered as intermediate or transition stages in the conversion of the tetraphenols into the bis(cyclic carbonates).

Each X value may independently be hydrogen or any lower alkyl radical (i.e., alkyl radical containing up to 7 carbon atoms) and each Z value may independently be any lower alkyl radical. The alkyl radicals may be normal or branched; examples are methyl, ethyl, 1-propyl, 2-propyl, 1-butyl, 2-butyl, isobutyl, t-butyl, 1-pentyl, neopentyl, hexyl, 2,3-dimethylbutyl and 1-heptyl. Preferred are the n-alkyl radicals and especially those containing 1–3 carbon atoms. The methyl radical is most preferred.

It is within the scope of the invention for all alkyl radicals to be different. Most often, however, all Z values are the same and all X values are the same.

The tetraphenols of this invention may be prepared by the condensation of a dialdehyde of formula III with at least one phenol of formula IV. This method of preparation is another aspect of the invention. Illustrative dialdehydes are succinaldehyde, dimethylmalonaldehyde, glutaraldehyde, suberaldehyde and sebacaldehyde; illustrative phenols are p-cresol, 2,4-dimethylphenol and 2-ethyl-4-n-butylphenol. If a mixture of phenols is used, the distribution of the X and Z substituents on the tetraphenol will vary according to the molecular structures of the phenol reactants and their relative reactivities with the dialdehyde. Most often, however, a single phenol reactant is used and all four of the phenolic moieties in the tetraphenol have the same substituents.

As will be apparent from formula I, the stoichiometry of the reaction requires at least four moles of phenol reactant for each mole of dialdehyde. Most often, an excess of phenol is used, typically a 50–100% excess. The reaction is ordinarily carried out in the presence of a mineral acid such as hydrochloric or sulfuric acid, using a catalytic amount of a mercaptan such as mercaptoacetic acid. Normal reaction temperatures are in the range of about 30°–100° C., with 40°–60° C. being preferred.

The preparation of the tetraphenols of this invention is illustrated by the following examples.

EXAMPLE 1

A 2000-ml. four-neck flask was fitted with a mechanical stirrer, a gas inlet tube, a dropping funnel and drying tube which had a nitrogen purge line passing past its outlet. The flask was placed in a 50°–55° C. water bath. To the flask was added 1000 grams (9.25 moles) of melted p-cresol. The flask was purged with nitrogen, then anhydrous hydrogen chloride was introduced until the p-cresol was saturated with it and 2 ml. of mercaptoacetic acid was added. With good agitation and continuous slow addition of hydrogen chloride, 256 grams (1.28 mole) of a 50% aqueous solution of glutaraldehyde was added dropwise over 3 hours. During the addition of the aldehyde, a precipitate began to form and by the end of the addition of the reaction mixture had become a thick paste. The water bath was then removed and the reaction mixture allowed to stand 3 days at room temperature. Volatiles were removed with a water aspirator vacuum and a water layer which had formed on the surface of the mixture was removed by decanting. Toluene was then added to the flask and the mixture stirred until it formed a uniform slurry. The mixture was transferred to a larger flask where it was mixed with additional toluene to a final total volume of 4000 ml. The precipitate was collected by vacuum filtration and washed with an additional 1400 ml. of toluene. The resulting hard paste was washed twice with 1500 ml. of water, with a Waring blender being used initially to produce a uniform aqueous slurry. The final pH of the water filtrate was 4 to 5. The sample was dried in a vacuum desiccator (about 1 torr) to yield 405 grams (65%) of the desired 1,1,5,5-tetra-(5-methyl-2-hydroxyphenyl)-pentane as a white powder (m.p. 220°–228° C.).

EXAMPLE 2

A 500-gram sample of 25% aqueous glutaraldehyde was extracted five times with 250-ml. portions of methylene chloride and the combined extracts dried over $MgSO_4$, filtered and the solvent partially removed on a rotary evaporator to yield 200 ml. of a methylene chloride solution of glutaraldehyde. By NMR analysis, the solution was found to contain approximately 48 grams (0.48 mole) of glutaraldehyde.

A 1000-ml. four-neck flask was fitted with a mechanical stirrer, a gas inlet tube, a dropping funnel and a drying tube which had a nitrogen purge line passing past its outlet. The flask was placed in a 60° C. water bath. To the flask was added 489 grams (4.0 moles) of 2,4-dimethylphenol. The flask was purged with nitrogen and anhydrous HCl was added until saturation, followed by 1 ml. of mercaptoacetic acid. With good agitation and continuous slow addition of HCl, the glutaraldehyde solution was added dropwise over three hours. A precipitate began to form after about 130 ml. of the solution had been added. The reaction mixture was allowed to stand at room temperature for 16 hours, then it was slurried in 1200 ml. of toluene, vacuum filtered and the precipitate re-slurried in 500 ml. of toluene, filtered and allowed to air dry. The resultant powder was washed four times with 500 ml. of distilled water, then two times with 250 ml. of toluene. The sample was dried in a vacuum desiccator (about 1 torr) to yield 242 grams (91%) of the desired 1,1,5,5-tetra-(3,5-dimethyl-2-hydroxyphenyl)-pentane as a white powder (m.p. 236°–242° C.).

The bis(cyclic carbonates) of this invention may be prepared by reacting the above-identified tetraphenols with phosgene, said reaction being another aspect of the invention. It is typically carried out at temperatures within the range of about 30°–100° C., preferably about 40°–85° C.

In one embodiment of the invention, the reaction is conducted in solution in a substantially inert organic diluent such as methylene chloride, chloroform, benzene, toluene or xylene. A basic reagent, typically a tertiary amine such as pyridine or triethylamine, is usually incorporated in the reaction mixture as a hydrogen chloride scavenger. The phosgene is typically employed in about 10–25% excess of the 2:1 stoichiometric molar ratio, and the tertiary amine in an approximately stoichiometric amount with respect to liberated hydrogen chloride.

Another embodiment employs an interfacial system analogous to those used for preparation of polycarbonates from bisphenols and phosgene. In such systems, there are present an aqueous phase and an organic phase substantially immiscible therewith. The aqueous phase is maintained strongly basic by the preence of an alkaline reagent such as sodium hydroxide. A catalyst, usually a tertiary amine such as triethylamine, is also generally present. The temperature and proportion of phosgene employed are typically within the ranges employed in the solution method and/or known in the art. Interfacial systems of this type are well known in the art and no detailed description thereof is deemed necessary. U.S. Pat. Nos. 4,384,108 and 4,471,105, for example, contain general disclosures of such systems and are incorporated by reference herein principally for said disclosures.

The preparation of the bis(cyclic carbonates) of this invention is illustrated by the following examples.

EXAMPLE 3

A 2000-ml. four-neck flask was fitted with a mechanical stirrer, a gas inlet tube, a dry ice condenser which had its outlet connected through a drying tube to a caustic scrubber and an inlet tube about an inch long connected through polypropylene tubing to a liquid metering pump ("Lab Pump, Jr.", RHSY, Fluid Metering, Inc.) to which was connected an additional funnel. A solution of 74.5 grams (0.15 mole) of the tetraphenol of Example 1 and 55 ml. (0.68 mole) of pyridine diluted to a total volume of 300 ml. with methylene chloride was placed in the addition funnel. 1.25 liters of methylene chloride was placed in the flask. With the flask in a 10° C. water bath, 34 grams (0.34 mole) of phosgene was added at 1 gram/min. The bath was then warmed to 38°-40° C. and, with vigorous stirring, the tetraphenol solution was added dropwise over a period of 8 hours. The flask was then allowed to cool to room temperature and the reaction mixture allowed to stand 16 hours, during which time large crystals of pyridinium hydrochloride formed. The solution was decanted from the crystals, washed three times with 400 ml. of distilled water, dried over $MgSO_4$ and filtered. The solvent was removed on a rotary evaporator to yield a white paste which was placed under a 0.5-torr vacuum for 16 hours to yield a hard, brittle solid. The solid was broken up and stirred with 60 ml. of toluene to yield a uniform slurry which upon vacuum filtration yielded a white powder. The powder was washed a second time with 60 ml. of toluene, then twice with 60 ml. of methanol, and dried under vacuum to yield 36 grams (44%) of the desired bis(cyclic carbonate) as a fine white powder (m.p. 269°-276° C.).

EXAMPLE 4

The apparatus was set up as in Example 3. A solution of 74.5 grams (0.15 mole) of the tetraphenol of Example 1 and 55 ml. (0.68 mole) of pyridine diluted to a total volume of 200 ml. with methylene chloride was placed in the addition funnel. 1.25 liter of toluene was placed in the flask. With the flask in a 10° C. water bath, 5 grams of phosgene was added at 1 gram/min. The water bath temperature was then raised to 85° C. and over a period of 60 minutes with vigorous stirring the solution was added dropwise with simultaneous addition of phosgene at 0.5 gram/min. (35 grams, 0.35 mole total phosgene). A white precipitate formed during the addition. After allowing the reaction mixture to cool to room temperature and to stand 16 hours, the precipitate, which was a mixture of product and pyridinium hydrochloride, was collected by vacuum filtration and dried to a white powder under vacuum. (Removal of solvent from the filtrate on a rotary evaporator yields a viscous oil and no additional precipitate.) The powder was washed twice with 500 ml. of water, then once with 150 ml. of methanol, and dried under vacuum to yield 29 grams (35%) of the desired bis(cyclic carbonate) as a fine, white powder (m.p. 260°-277° C.).

EXAMPLE 5

A 2000-ml. four-neck flask is fitted with a mechanical stirrer, a pH probe, a gas inlet tube and a Claisen adaptor to which is attached a dry ice condenser and an aqueous caustic inlet tube. To the flask is added 900 ml. of methylene chloride, 560 ml. of distilled water, 3.4 ml. of triethylamine, and a 11-gram (0.02 mole) portion of the tetraphenol of Example 2. Phosgene is introduced into the flask at 1 gram/min. for 50 minutes, with simultaneous addition at 5-minute intervals of additional 11-gram portions of the tetraphenol to a total of 50 grams (0.5 mole) of phosgene and 110 grams (0.2 mole) of tetraphenol. The pH is maintained at 9-11 with addition of 25% aqueous NaOH. The methylene chloride layer is separated, washed once with 350 ml. of 3% aqueous HCl and three times with 350 ml. of distilled water, dried over $MgSO_4$, filtered and the solvent removed on a rotary evaporator to yield a solid residue. The solid is washed twice with 200-ml. portions of acetone, then recrystallized from toluene to yield the desired bis(cyclic carbonate) as a white powder (m.p. 231.5°-235.5° C.).

As previously mentioned, the bis(cyclic carbonates) of this invention are useful as crosslinking and anti-drip agents for polycarbonates. Accordingly, another aspect of the invention is a composition comprising a major proportion of at least one polycarbonate compound having a plurality of structural units of formula V, wherein $A^1$ is a divalent aromatic radical, and a minor proportion of at least one bis(cyclic carbonate) as described hereinabove.

In one embodiment of the invention, the polycarbonate compound is one of the aromatic polycarbonate resins known in the art. They are generally derived from dihydroxyaromatic compounds of which the following are examples:

2,2-bis-(4-hydroxyphenyl)propane (bisphenol A)
hydroquinone
resorcinol
2,2-bis-(4-hydroxyphenyl)pentane
2,4'-dihydroxydiphenylmethane
bis-(2-hydroxyphenyl)methane
bis-(4-hydroxyphenyl)methane
bis-(4-hydroxy-5-nitrophenyl)methane
1,1-bis(4-hydroxyphenyl)ethane
3,3-bis(4-hydroxyphenyl)pentane
2,2-dihydroxybiphenyl
2,6-dihydroxynaphthalene
bis-(4-hydroxydiphenyl) sulfone
bis-(3,5-diethyl-4-hydroxyphenyl) sulfone
2,2-bis-(3,5-dimethyl-4-hydroxyphenyl)propane
2,4'-dihydroxydiphenyl sulfone
5'-chloro-2,4'-dihydroxydiphenyl sulfone
bis-(4-hydroxybiphenylyl) sulfone
4,4'-dihydroxydiphenyl ether
4,4'-dihydroxy-3,3'-dichlorodiphenyl ether
4,4'-dihydroxy-2,5-dihydroxydiphenyl ether.

Other dihydroxyaromatic compounds which are suitable for use in the preparation of aromatic polycarbonate resins are disclosed in U.S. Pat. Nos. 2,999,835, 3,038,365, 3,334,156 and 4,131,575.

The $A^1$ values preferably have formula VI, wherein each of $A^2$ and $A^3$ is a single-ring divalent aromatic radical and Y is a bridging radical in which one or two atoms separate $A^2$ from $A^3$. The free valence bonds in formula VI are usually in the meta or para positions of $A^2$ and $A^3$ in relation to Y. Such $A^1$ values may be considered as being derived from bisphenols of the formula $HO-A^2-Y-A^3-OH$.

In formula VI, the $A^2$ and $A^3$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ from $A^3$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical of formula II is the 2,2-bis(4-phenylene)propane radical, which is derived from bisphenol A and in which Y is 2,2-propylene and $A^2$ and $A^3$ are each p-phenylene.

These aromatic polycarbonate resins can be manufactured by known processes, such as by reacting a dihydric phenol with a carbonate precursor such as phosgene, in accordance with methods set forth in the aforementioned patents and U.S. Pat. Nos. 4,018,750 and 4,123,426, or by transesterification process such as are disclosed in U.S. Pat. No. 3,153,008, as well as other processes known to those skilled in the art.

It is possible to employ two or more different dihydric phenols, a copolymer of a dihydric phenol with a glycol, a hydroxy- or acid-terminated polyester or a dibasic acid in the event a carbonate copolymer or interpolymer or polyester-polycarbonate rather than a carbonate homopolymer is desired for use in the preparation of the resinous compositions of this invention. Branched polycarbonates, such as those described in U.S. Pat. No. 4,001,184, are also useful. The disclosures of all of the aforementioned patents are incorporated by reference herein. Blends of any of the above materials may also be employed.

Crosslinking according to the present invention may be carried out by reacting the bis(cyclic carbonate) with the aromatic polycarbonate in the melt form in the presence of catalytic quantities of a transesterification catalyst. One of the benefits of using a cyclic carbonate is that there should be significantly less fragmentation of the polycarbonate chain. The cyclic carbonate opens up, thus allowing addition at either side of the carbonate group. This allows for formation of structures of the type represented by formula VII, wherein $R^1$, $R^2$, $R^3$ and $R^4$ represent polycarbonate moieties of various chain lengths which may be derived from polycarbonates of the formulas $R^1OCOOR^2$ and $R^3OCOOR^4$.

The amount of bis(cyclic carbonate) used will depend on the extent of crosslinking desired. In general, about 0.001–10 mole percent is used, based on polycarbonate structural units.

The reaction temperature should be sufficiently high to create a melt of the reactants, generally in the range of about 200°–350° C. When a polycarbonate resin is employed, such temperatures are typically achieved in an extruder or a molding machine such as an injection or compression molder normally employed for extruding or molding such resins.

The final physical form of the crosslinked polycarbonate is at least partially dependent upon the quantity of bis(cyclic carbonate) present. If desired, gel-like forms such as highly crosslinked thermoset materials can be avoided by utilizing relatively small quantities of the bis(cyclic carbonate). The gels occur when greater quantities of the bis(cyclic carbonate) are present. Also of significance are the reaction temperature and time.

Also useful as polycarbonate compounds in the compositions of this invention are the cyclic polycarbonate oligomers. These are cyclic compounds containing a plurality of structural units of formula V. They include dimers, trimers and tetramers of the type disclosed in the following U.S. patents:

| | |
|---|---|
| 3,155,683 | 3,386,954 |
| 3,274,214 | 3,422,119. |

They also include cyclic polycarbonate oligomer mixtures of the type disclosed in copending, commonly owned application Ser. No. 704,122, filed Feb. 22, 1985, the disclosure of which is incorporated by reference herein.

The cyclic oligomer mixtures consist essentially of oligomers having degrees of polymerization from 2 to about 30 and preferably to about 20, with a major proportion being up to about 12 and a still larger proportion up to about 15. Since they are mixtures, these compositions have relatively low melting points as compared to single compounds such as the corresponding cyclic trimer. The cyclic oligomer mixtures are generally liquid at temperatures above 300° C. and most often at temperatures above 225° C.

The mixtures useful in this invention contain very low proportions of linear oligomers. In general, no more than about 10% by weight, and most often no more than about 5%, of such linear oligomers are present. The mixtures also contain low percentages (frequently less than 30% and preferably no higher than about 20%) of polymers (linear or cyclic) having a degree of polymerization greater than about 30. Such polymers are frequently identified hereinafter as "high polymer". These properties, coupled with the relatively low melting points and viscosities of the cyclic oligomer mixtures, contribute to their utility in the invention.

These mixtures may be prepared by a condensation reaction involving bishaloformates having the formula $A^1(OCOQ^5)_2$, wherein $A^1$ is as defined hereinabove and $Q^5$ is chlorine or bromine. The condensation reaction typically takes place interfacially when a solution of said bishaloformate in a substantially non-polar organic liquid is contacted with a tertiary amine from a specific class and an aqueous alkali metal hydroxide solution.

In one method for preparing the cyclic oligomer mixture, at least one such bishaloformate is contacted with at least one oleophilic aliphatic or heterocyclic tertiary amine and an aqueous alkali metal hydroxide solution having a concentration of about 0.1–10 M, said contact being effected under conditions resulting in high dilution of bishaloformate, or the equivalent thereof, in a substantially non-polar organic liquid which forms a two-phase system with water; and subsequently, the resulting cyclic oligomer mixture is separated from at least a portion of the high polymer and insoluble material present.

While the $Q^5$ values may be chlorine or bromine, the bischloroformates, in which $Q^5$ is chlorine, are most readily available and their use is therefore preferred. (Frequent reference to bischloroformates will be made hereinafter, but it should be understood that other bishaloformates may be substituted therefor as appropriate.)

The tertiary amines useful in the preparation of the cyclic polycarbonate oligomers generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in the aforementioned U.S. Pat. Nos. 4,217,438 and in 4,368,315, the disclosure of which is also incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and the bischloroformate is essential for the formation of the cyclic oligomer mixture. For the most part, such amines contain at least about 6 and preferably about 6–14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

The aqueous alkali metal hydroxide solution is most often lithium, sodium or potassium hydroxide, with sodium hydroxide being preferred because of its availability and relatively low cost. The concentration of said solution is about 0.2–10 M and preferably no higher than about 3 M.

The fourth essential component in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran.

To prepare the cyclic oligomer mixture according to the above-described method, the reagents and components are maintained in contact under conditions wherein the bischloroformate is present in high dilution, or equivalent conditions. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformate or a mixture thereof with the amine is added gradually to a mixture of the other materials. It is within the scope of this embodiment to incorporate the amine in the mixture to which the bischloroformate is added, or to add it gradually, either in admixture with the amine or separately. Continuous or incremental addition of the amine is frequently preferred, whereupon the cyclic oligomer mixture is obtained in relatively pure form and in high yield.

Although addition of the bischloroformate neat (i.e., without solvents) is within the scope of this embodiment, it is frequently inconvenient because many bischloroformates are solids. Therefore, it is preferably added as a solution in a portion of the organic liquid. The proportion of organic liquid used for this purpose is not critical; about 25–75% by weight, and especially about 40–60%, is preferred.

The reaction temperature is generally in the range of about 0°–50° C. It is most often about 0°–40° C. and preferably 20°–40° C.

For maximization of the yield and purity of cyclic oligomers as opposed to high polymer and insoluble and/or interactable by-products, it is preferred to use not more than about 0.7 mole of bischloroformate per liter of organic liquid present in the reaction system, including any liquid used to dissolve said bischloroformate. Preferably, about 0.003–0.6 mole of bischloroformate is used. It should be noted that this is not a molar concentration in the organic liquid when the bischloroformate is added gradually, since it is consumed as it is added to the reaction system.

The molar proportions of the reagents constitute another important feature for yield and purity maximization. The preferred molar ratio of amine to bischloroformate is about 0.1–1.0:1 and most often about 0.2–0.6:1. The preferred molar ratio of alkali metal hydroxide to bischloroformate is about 1.5–3:1 and most often about 2–3:1.

Step II of the cyclic oligomer preparation method is the separation of the oligomer mixture from at least a portion of the high polymer and insoluble material present. When other reagents are added to the alkali metal hydroxide and the preferred conditions and material proportions are otherwise employed, the cyclic oligomer mixture (obtained as a solution in the organic liquid) typically contains less than 30% by weight and frequently less than about 20% of high polymer and insoluble material. When all of the preferred conditions are employed, the product may contain 10% or even less of such material. Depending on the intended use of the cyclic oligomer mixture, the separation step may then be unnecessary.

Therefore, a highly preferred method for preparing the cyclic oligomer mixture comprises the single step of conducting the reaction using as the amine at least one aliphatic or heterocyclic tertiary amine which, under the reaction conditions, dissolves preferentially in the organic phase of the reaction system, and gradually adding bischloroformate, amine and alkali metal hydroxide simultaneously to a substantially non-polar organic liquid or a mixture of said liquid with water, said liquid or mixture being maintained at a temperature in the range of about 0°–50° C.; the amount of bischloroformate used being up to about 0.7 mole for each liter of said organic liquid present in the reaction system, and the molar proportions of amine and alkali metal hydroxide to bischloroformate being 0.2–1.0:1 and 2–3:1, respectively; and recovering the cyclic oligomers thus formed.

As in the embodiment previously described, another portion of said liquid may serve as a solvent for the bischloroformate. Addition of each reagent is preferably continuous, but may be incremental for any or all of said reagents.

When a separation step is necessary, the unwanted impurities may be removed in the necessary amounts by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent. Recovery of the cyclic oligomers normally means merely separating the same from diluent (by known methods such as vacuum evaporation) and, optionally, from high polymer and other impurities.

The preparation of cyclic oligomer mixtures useful in this invention is illustrated by the following examples. All parts and percentages in the examples herein are by weight unless otherwise indicated. Temperatures are in degrees Celsius. Molecular weights, whenever referred to herein, are weight average unless otherwise indicated and were determined by gel permeation chromatography relative to polystyrene.

EXAMPLES 6–23

Bisphenol A bischloroformate was reacted with aqueous sodium hydroxide and triethylamine in an organic liquid (chloroform in Example 12, methylene chloride in all other examples) according to the following procedure: The bischloroformate was dissolved in half the amount of organic liquid employed and was added gradually, with slow stirring, to the balance of the reaction mixture. In Examples 6–15 and 17, the triethylamine was all originally present in the reaction vessel; in Examples 19–21, it was added gradually at the same time as the bischloroformates; and in Examples 16, 18, 22 and 23, it was added incrementally at the beginning of bischloroformate addition and at intervals of 20% during said addition. The amount of sodium hydroxide used was 2.4 moles per mole of bischloroformate. After all the bischloroformate had been added, the mixture was stirred for about 2 minutes and the reaction was quenched by the addition of a slight excess of 1M aqueous hydrochloric acid. The solution in the organic liquid was washed twice with dilute aqueous hydrochloric acid, dried by filtration through phase separation paper and evaporated under vacuum. The residue was dissolved in tetrahydrofuran and high polymers were precipitated by addition of acetone.

The reaction conditions for Examples 6–23 are listed in Table I together with the approximately percentage (by weight) of cyclic polycarbonate oligomer present in the product before high polymer precipitation. The weight average molecular weights of the cyclic oligomer mixtures were approximately 1300, corresponding to an average degree of polymerization of about 5.1.

TABLE I

| Example | Bischloroformate amt., mmole/l. org. liquid | Bischloroformate amt., total mmol. | NaOH molarity | Molar ratio, amine: bischloroformate | Temperature | Addition time, min. | % oligomer in product |
|---|---|---|---|---|---|---|---|
| 6  | 100 | 2  | 0.313 | 0.5  | 20    | 30  | 97 |
| 7  | 100 | 2  | 0.625 | 0.5  | 20    | 30  | 95 |
| 8  | 100 | 2  | 2.5   | 0.5  | 35    | 55  | 93 |
| 9  | 100 | 2  | 2.5   | 0.5  | 0     | 30  | 77 |
| 10 | 100 | 2  | 2.5   | 0.5  | 20    | 30  | 87 |
| 11 | 100 | 2  | 2.5   | 0.5  | 35    | 30  | 78 |
| 12 | 100 | 2  | 2.5   | 0.5  | 50    | 30  | 88 |
| 13 | 100 | 2  | 2.5   | 0.25 | 20    | 30  | 74 |
| 14 | 100 | 1  | 2.5   | 0.2  | 20    | 15  | 75 |
| 15 | 200 | 4  | 2.5   | 0.5  | 20    | 30  | 88 |
| 16 | 500 | 10 | 2.5   | 0.25 | 25    | 105 | 83 |
| 17 | 500 | 10 | 2.5   | 0.25 | 25    | 105 | 78 |
| 18 | 500 | 10 | 2.5   | 0.25 | 25    | 105 | 83 |
| 19 | 500 | 10 | 2.5   | 0.25 | 25    | 105 | 87 |
| 20 | 500 | 10 | 2.5   | 0.29 | 30    | 90  | 78 |
| 21 | 500 | 10 | 2.5   | 0.25 | 30    | 20  | 75 |
| 22 | 500 | 10 | 2.5   | 0.25 | 40–45 | 105 | 79 |
| 23 | 500 | 10 | 2.5   | 0.4  | 25    | 105 | 79 |

EXAMPLE 24

Bisphenol A bischloroformate (2.0 mmol.) was reacted with aqueous sodium hydroxide and 4-dimethylaminopyridine in methylene chloride. The procedure employed was that of Example 6, except that 66.67 mmol. of bisphenol A per liter of methylene chloride was employed, the aqueous sodium hydroxide concentration was 5.0 M and the reaction temperature was about 25° C. The product comprised 85% cyclic oligomer.

The transesterification catalysts used in the reaction of the polycarbonate resin or oligomer with the bis(cyclic carbonate) may be any basic catalysts usually employed in such reactions. These include oxides, hydrides, hydroxides or amides of the alkali or alkaline earth metals as well as basic metal oxides such as zinc oxides, salts of weak acids such as lithium stearate and organotitanium, organoaluminum and organotin compounds such as tetraoctyl titanate, as well as the tetraphenylborate salts disclosed in copending, commonly owned application Ser. No. 723,672, filed Apr. 16, 1985 now U.S. Pat. No. 4,605,731 the disclosure of which is incorporated by reference herein. Because of potential steric hindrance, it is preferred to use catalysts with less bulky groups, e.g. lithium stearate as opposed to tetraoctyl titanate.

The preparation of the polycarbonate compositions of this invention is illustrated by the following examples. Molar proportions are based on polycarbonate structural units.

EXAMPLE 25

2.5 grams (0.01 mole) of bisphenol A polycarbonate powder (intrinsic viscosity of 0.49–0.52 in methylene chloride at 25° C.) was combined with $10^{-5}$ mole of tetraoctyl titanate (TOT) or lithium stearate (LiST) catalyst (0.1 mole percent) and 2 or 5 mole percent of bis(cyclic carbonate) at 300° C. under $N^2$ for a period of twenty minutes with thorough stirring of the melt. The quantity of gel was determined by swelling the resin thus produced with methylene chloride, filtering and washing with additional methylene chloride. The results are shown in Table II.

TABLE II

| Bis(cyclic carbonate) | | Percent gel | |
|---|---|---|---|
| Example | Quantity, mole % | TOT | LiST |
| 3 | 2 | 23 | 25 |
| 3 | 5 | 57 | 47 |
| 5 | 2 | 5 | 25 |
| 5 | 5 | 4 | 52 |

In addition to these samples, five separate controls were run at the same time and temperature: bisphenol A polycarbonate alone and in combination with tetraoctyl titanate, lithium stearate, the Example 3 bis(cyclic carbonate) and the Example 5 bis(cyclic carbonate). No gels were formed with any of the control formulations.

EXAMPLE 26

A solid mixture of 25 parts of a cyclic bisphenol A polycarbonate oligomer mixture similar to that of Example 6, 3 parts of the bis(cyclic carbonate) of Example 3 and 0.1 mole percent of the bisisopropoxyaluminum salt of ethyl acetoacetate was heated for 4 hours at 250° C., under nitrogen. The crosslinked polymer thus obtained was weighed and the unreacted polycarbonate was removed therefrom by extraction with methylene chloride for 48 hours in a Soxhlet extractor. The crosslinked residue was dried under vacuum at 75° C. for 12 hours and weighed. It was found to comprise 46.5% of the total polycarbonate obtained.

EXAMPLE 27

The procedure of Example 26 was repeated, except that the polymerization catalyst was tetramethylammonium tetraphenylborate. The crosslinked product comprised 99.7% of the total polymer.

The bis(cyclic carbonates) of this invention are also useful as anti-drip agents for polycarbonate resins, especially when used in combination with known flame retardant agents. Accordingly, another aspect of the invention is a polycarbonate resin composition which, in addition to the bis(cyclic carbonate), also contains an effective amount of at least one such flame retardant agent. The flame retardant agents are conventional that positively upgrade the flame retardancy of polycarbonates.

Some particularly useful flame retardants are the alkali and alkaline earth metal salts of organic sulfonic acids. These types of flame retardants are disclosed, for example, in the following U.S. patents, all of which are hereby incorporated by reference:

| | | |
|---|---|---|
| 3,775,367 | 3,926,908 | 3,951,810 |
| 3,836,490 | 3,931,100 | 3,953,396 |
| 3,909,490 | 3,933,734 | 3,953,399 |
| 3,917,559 | 3,940,366 | 3,978,024. |
| 3,919,167 | 3,948,851 | |

They include sodium 2,4,5-trichlorobenzenesulfonate, sodium benzenesulfonate, disodium naphthalene-2,6-disulfonate, sodium p-iodobenzenesulfonate, sodium 4,4'-dibromobiphenyl-3-sulfonate, sodium 2,3,4,5,6-pentachloro-$\beta$-styrenesulfonate, sodium 4,4'-(dichlorodiphenyl sulfide)-3-sulfonate, disodium (tetrachlorodiphenyl ether) disulfonate, disodium 4,4'-dichlorobenzophenone-3,3'-disulfonate, sodium 2,5-dichlorothiophene-3-sulfonate, sodium diphenylsulfone-3-sulfonate, sodium dimethyl 2,4,6-trichloro-5-sulfoisophthalate, potassium 2,4,5-trichlorobenzenesulfonate, calcium 2,4,5-trichlorobenzenesulfonanilide-4'-sulfonate, sodium 4'-(1,4,-5,6,7,7-hexachlorobicyclo[2.2.1]hept-5-en-endo-2-yl)-benzenesulfonate and sodium perfluoroalkylsulfonate wherein alkyl is butyl or octyl.

Conventional flame retardants other than the aforementioned sulfonates may also be employed. These conventional flame retardant additives generally contain a halogen, preferably chlorine and/or bromine. That is to say, they are a halogen source. They may be inorganic or organic. Typical of the inorganic halogen sources are NaCl, KBr, etc. The organic halogen sources are preferably aromatic although certain aliphatic compounds are also useful. They include disodium hexafluoroglutarate, disodium chloranilate, the halodiphenyl ethers such as tetrabromodiphenyl ether, polycarbonates derived from tetrabromobisphenol A and carbonate copolymers derived from tetrabromobisphenol A and bisphenol A.

These flame retardant additives are present in the instant compositions in a flame retardant amount. By flame retardant amount is meant an amount effective to render said compositions flame retardant. Generally this amount is about 0.01-10 weight percent of flame retardant or of halogen in a halogenated flame retardant, based on the total weight of the composition. About 0.1-5 weight percent is preferred. The bis(cyclic carbonates) are present in an anti-drip amount which is usually about 0.1-5.0% by weight.

The compositions of this invention may also contain other commonly known and used additives. These include ultraviolet radiation absorbers such as the benzophenones, benzotriazoles, cyanoacrylates, and the like; hydrolytic stabilizers such as the epoxides disclosed in U.S. Pat. Nos. 3,489,716, 4,138,379 and 3,839,247; and color stabilizers such as the organophosphites disclosed in U.S. Pat. Nos. 3,305,520 and 4,118,370. The disclosures of all of the foregoing are incorporated by reference herein.

The preparation of the flame-retardant resin compositions of the present invention is illustrated by the following examples.

EXAMPLES 28-29

The blends listed in Table III were prepared by extrusion at 265° C. followed by comminution of the extrudate into pellets.

TABLE III

| | Parts by weight | | | | | |
|---|---|---|---|---|---|---|
| Ingredient | Example 28 | Example 29 | Control 1 | Control 2 | Control 3 | Control 4 |
| Bisphenol A polycarbonate similar to that of Example 25 | 100 | 976.8 | 100 | 100 | 100 | 976.8 |
| Copolycarbonate of 1,1-bis(4-hydroxyphenyl)-propane and 1,1-bis(3,5-dibromo-4-hydroxyphenyl)propane, containing 4.2% Br | — | 232.2 | — | — | — | 232.2 |

TABLE III-continued

| Ingredient | Parts by weight | | | | | |
| --- | --- | --- | --- | --- | --- | --- |
| | Example 28 | Example 29 | Control 1 | Control 2 | Control 3 | Control 4 |
| Sodium 2,4,5-trichlorobenzenesulfonate | 0.6 | — | — | 0.6 | 0.6 | — |
| Lithium hydroxide | 0.00055 | — | — | — | 0.00055 | — |
| Bis(cyclic carbonate) of Example 3 | 1.1 | — | — | — | — | — |
| Bis(cyclic carbonate) of Example 5 | — | 1.72 | — | — | — | — |

The blends were injection molded at about 315° C. into test bars which were subjected to the test procedure described in Underwriters Laboratories Bulletin 94. In accordance with this test procedure, the materials were rated V-O, V-I or V-II based on the burning properties of five specimens. The criteria for each rating was as follows.

V-O: Average flaming and/or glowing after removal of the igniting flame shall not exceed 5 seconds, and none of the specimens shall drip particles which ignite absorbent cotton.

V-I: Average flaming and/or glowing after removal of the igniting flame shall not exceed 25 seconds and none of the specimens shall drip particles which ignite absorbent cotton.

V-II: Average flame and/or glowing after removal of the igniting flame shall not exceed 25 seconds and the specimens drip flaming particles which ignite absorbent cotton.

UL-94 requires that all test parts must meet the V type rating to achieve the particular rating. Otherwise, the 5 bars receive the rating of the worst single bar. For example, if one bar is classified as UL-94 V-II and the other four (4) are classified as UL-94 V-O, then the rating for all 5 bars is UL-94 V-II. In addition, a test bar which continued to burn for more than 25 seconds after removal of the igniting flame was classified, not by UL-94 but by the standards of the instant invention, as "burning".

The results are shown in Table IV.

TABLE IV

| Example | Flammability rating |
| --- | --- |
| 28 | V-O |
| 29 | V-O |
| Control 1 | Burns |
| Control 2 | V-II |
| Control 3 | V-II |
| Control 4 | V-II |

As illustrated by these data, the examples containing a flame retardant additive but no bis(cyclic carbonate) inhibit a certain degree of flame retardance but nevertheless also exhibit dripping. On the other hand, when the bis(cyclic carbonate) of this invention is used in conjunction with the flame retardant additives, they exhibit drip retardant characteristics.

EXAMPLE 30

To 100 parts by weight of the polycarbonate of Examples 28-29 was added 0.6 parts of sodium 2,4,5-trichlorobenzenesulfonate. The mixture was extruded, molded into test bars and tested in the same manner as Examples 28-29. Each of the five test bars had at least one flaming drip and had an average flame-out time of 3.9 seconds and a range of flame-out times of 1.2 to 11.6 seconds.

EXAMPLE 31

To the composition of Example 30 prior to extrusion was added 1.1% of the bis(cyclic carbonate) of Example 3. Only three of the five test bars had at least one flaming drip. The average flame-out time was 1.9 seconds with a range of flame-out times from 0.1 to 4.3 seconds.

What is claimed is:

1. A composition comprising a major proportion of (A) at least one cyclic polycarbonate oligomer having a plurality of structural units of the formula

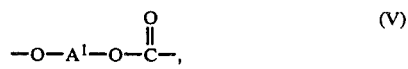

wherein $A^1$ is a divalent aromatic radical, and a minor proportion of (B) at least one bis(cyclic carbonate) having the formula

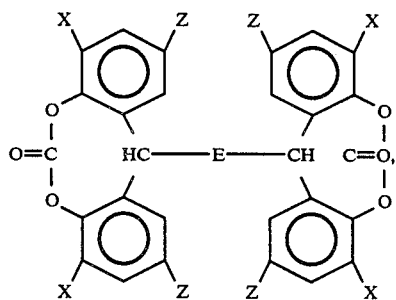

wherein:
E is an alkylene radical containing from 2 to about 12 carbon atoms;
each X is independently hydrogen or lower alkyl; and
each Z is independently lower alkyl.

2. A composition according to claim 1 wherein the amount of bis(cyclic carbonate) is a crosslinking amount and is about 0.001-10 mole percent based on polycarbonate structural units.

3. A composition according to claim 2 wherein E is a normal alkylene radical having 2-6 carbon atoms.

4. A composition according to claim 3 wherein component A is a mixture of cyclic polycarbonate oligomers having degrees of polymerization from 2 to about 12.

5. A composition according to claim 4 wherein $A^1$ is 2,2-bis(4-phenylene)propane.

6. A composition according to claim 5 wherein each X is hydrogen or methyl and each Z is methyl.

7. A composition according to claim 6 wherein E is trimethylene.

8. A composition according to claim 7 wherein each X is hydrogen.

9. A composition according to claim 7 wherein each X is methyl.

10. A method of preparing a crosslinked polycarbonate composition which comprises heating a composition according to claim 1 at a temperature in the range of about 200°-350° C. in the presence of a catalytic quantity of a transesterification catalyst.

11. A method according to claim 10 wherein the amount of bis(cyclic carbonate) is about 0.001-10 mole percent based on polycarbonate structural units.

12. A method according to claim 11 wherein E is a normal alkylene radical having 2-6 carbon atoms.

13. A method according to claim 12 wherein component A is a mixture of cyclic polycarbonate oligomers having degrees of polymerization from 2 to about 12.

14. A method according to claim 13 wherein $A^1$ is 2,2-bis(4-phenylene)propane.

15. A method according to claim 14 wherein each X is hydrogen or methyl and each Z is methyl.

16. A method according to claim 15 wherein E is trimethylene.

17. A method according to claim 16 wherein each X is hydrogen.

18. A method according to claim 16 wherein each X is methyl.

19. A crosslinked composition prepared by the method of claim 10.

20. A crosslinked composition prepared by the method of claim 13.

21. A crosslinked composition prepared by the method of claim 16.

* * * * *